Patented Sept. 25, 1945

2,385,524

UNITED STATES PATENT OFFICE 2,385,524

CONVERSION OF HYDROCARBONS

William J. Mattox, Riverside, Ill., assignor to Universal Oil Products Company, Chicago, Ill., a corporation of Delaware No Drawing. Application September 30, 1944, Serial No. 556,653

8 Claims. (Cl. 260—672)

This application is a continuation-in-part of my co-pending application Serial No. 430,502, filed February 11, 1942, now U. S. Patent 2,360,814, issued October 17, 1944.

This invention relates to the treatment of a mixture of polyalkylated cyclic hydrocarbons and non-alkylated cyclic hydrocarbons whereby alkyl substituent groups are transferred, and more particularly to the transfer of an alkyl group or groups from a polyalkylated aromatic hydrocarbon to a non-alkylated aromatic hydrocarbon in order to produce the mono-alkylated aromatic hydrocarbon.

Various processes have been used for producing mono-alkylated aromatic hydrocarbons as, for example, by the alkylation of benzene with an olefin or by the cyclization of aliphatic hydrocarbons containing at least seven carbon atoms. During the course of the alkylation and cyclization reactions, there is also produced varying amounts of alkylated aromatic hydrocarbons containing two or more substituent groups. For example, in the alkylation of benzene with ethylene to produce mono-ethylbenzene, there is also produced varying amounts of diethylbenzene. The present invention relates to a method for converting the polyalkylated aromatics into the more valuable mono-alkylated aromatics.

In a broad aspect the present invention relates to a process for the transfer of alkyl substituent groups from a polyalkylated aromatic hydrocarbon to a non-alkylated aromatic hydrocarbon, which comprises subjecting a proportioned mixture of said polyalkylated and said non-alkylated aromatic hydrocarbons to contact with an alumina-containing catalyst in the presence of a hydrogen halide under alkyl transfer conditions.

In one embodiment the present invention relates to a process for the manufacture of toluene, which comprises subjecting a proportioned mixture of dimethylbenzene and benzene to contact with alumina and hydrogen chloride at a temperature of from about 350 to about 700° C.

Suitable catalysts comprise alumina produced by the controlled calcination of a hydrated aluminum oxide either naturally occurring or synthetic. The preferred catalyst comprises gamma alumina as the only form of aluminum oxide present. This may be produced by the controlled calcination of natural or synthetic hydrated aluminum oxides at temperatures above about 500° C. and preferably not in excess of 900° C. for a sufficient length of time to convert the hydrated oxide into the gamma form without leaving substantial amounts of the hydrated oxide and without converting any of the gamma alumina into the alpha form. If the latter condition occurs the catalyst will be substantially inert or at least of greatly reduced activity.

Naturally occurring minerals or earths containing alumina may also be used in the process although they are not necessarily equivalent to one another or to the synthetic forms of alumina. Bauxite which may be calcined to convert it into gamma alumina is a particularly good example of naturally occurring earth. Other aluminiferous clays may be used.

Naturally occurring aluminiferous earths may be used in the process after being treated chemically, for example, with mineral acids, such as hydrochloric acid, followed by washing to remove soluble salts. These materials are further improved by calcination prior to use in the process.

Another type of clay which may be of considerable benefit comprises a synthetic mixture of silica and alumina prepared by the separate or simultaneous precipitation of hydrogels of the components from soluble compounds. These composites may be washed, dried, and calcined prior to use in the process.

The preferred hydrogen halide is hydrogen chloride although other hydrogen halides such as hydrogen bromide, hydrogen iodide and hydrogen fluoride may also be used. These are not necessarily exactly equivalent for my process.

In accordance with the invention a polyalkylated aromatic and a non-alkylated aromatic are contacted with the alumina-containing catalyst at a temperature of from about 350 to about 700° C., and preferably from about 400 to about 600° C. Under these conditions a transfer of the alkyl group from the polyalkylated aromatic to the non-alkylated aromatic occurs to produce the mono-alkylated aromatic hydrocarbon. Thus, xylene and benzene may be converted into toluene. Similarly, diethylbenzene and benzene may be converted into mono-ethylbenzene.

Atmospheric, superatmospheric or subatmospheric pressures may be employed. Good results may be obtained at pressures of from atmospheric to about 100 pounds per square inch. The pressure to be employed in any given operation will depend upon the temperature and space velocity as will be hereinafter set forth.

The space velocity employed may vary up to about 20, depending on the catalyst and the temperature. Higher space velocities may be used with more active catalysts and for a given catalyst at higher temperatures. Normally an hourly liquid space velocity of about 0.2 to 5 is used when employing temperatures within the range of about 400–600° C. The space velocity as used herein is defined as the volumes of liquid charge per volume of catalyst per hour, the liquid being measured at room temperature.

To successfully carry out my invention it is necessary to correlate the conditions of temperature, pressure, and space velocity and this in turn depends to a certain extent upon the catalyst employed. Certain forms of the alumina or alumina-containing catalysts are more active than others and higher space velocities at a given temperature may be used. Higher pressures should not be used with the higher temperatures in order to avoid undesirable cracking reactions. Lower space velocities permit the use of the lower temperatures.

The quantity of hydrogen halide employed may vary over a considerable range but normally at least 1 mol per cent is required. There is little benefit to be realized in using more than equimolar proportions of hydrocarbon and hydrogen halide. I do not, however, limit myself to this upper limit since it is possible to use higher ratios, even though in most cases there is no particular advantage in doing so.

The hydrogen halide may be separated and recycled to the process. It usually is not necessary to free the hydrogen halide completely of light hydrocarbon gases.

The unconverted polyalkylated aromatic hydrocarbon may be separated from the desired mono-alkylated hydrocarbon by fractionation or other suitable means, and the unconverted compounds may be recycled for further conversion.

The catalyst may be used in the form of granules or preformed particles or in the form of powders. The hydrocarbons undergoing treatment may be passed through beds of the alumina or alumina-containing catalyst, which may be contained in tubes or chambers. The reaction zone may or may not be externally heated. The catalyst may also be suspended in the hydrocarbon vapors in the form of a powder and passed through a heated reaction zone. In another modification the hydrocarbons and hydrogen halide may be contacted with fluidized powdered alumina. My invention is not limited to any particular apparatus or method of carrying out the contacting.

Under certain conditions and when using certain catalysts it may be desirable to add a relatively inert gas such as steam. This is of some utility, for example, when employing the synthetic silica-alumina type of catalyst. When desired, hydrogen or a hydrogen-containing gas may be supplied to the reaction zone.

Since benzene is more stable at high temperatures than the polyalkylated benzenes, one method of operation may comprise heating the benzene in a separate heating coil to a temperature in excess of the reaction temperature and then mixing the heated products with the polyalkylated benzenes which had been separately heated to a lower temperature. The heating of the separate streams must be controlled so that, upon admixture, the desired reaction temperature is obtained. When desired, additional heat may be supplied to the reaction zone by means of heated recirculated gas.

In general, it may be stated that the ease of transfer of alkyl groups increases with increasing molecular weight of the alkyl groups up to a certain point, after which increasing amounts of decomposition reactions occur. Thus, methyl groups, such as in xylenes and mesitylene, are the most difficult to transfer to benzene to produce toluene and require the use of the more severe reaction conditions. Ethyl groups are transferred more easily and propyl and butyl groups are transferred still more easily. When substituent groups having five or more carbon atoms are treated in accordance with the invention, there is an increasing tendency for side reactions to occur and it is necessary to use the more moderate conditions of operation.

The operating conditions will also be varied with the types of aromatics which are treated in the present invention. The present process can be employed effectively to transfer alkyl groups from either mono-nuclear or polynuclear aromatic hydrocarbons. Thus, methyl, ethyl, propyl and butyl substituent groups may be transferred from polyalkylated benzenes or polyalkylated naphthalenes to either benzene or naphthalene.

Another factor which requires consideration in the present process is the ratio of polyalkylated aromatic to non-alkylated aromatic. There should be at least one mol of non-alkylated aromatic hydrocarbon for each substituent group in excess of one in the polyalkylated aromatic and preferably an excess of the non-alkylated hydrocarbon is used. The ratio of non-alkylated aromatic hydrocarbon to polyalkylated aromatic may vary over considerable range as, for example, from 1:1 to 10:1 or more and preferably is within the range of from about 2:1 to about 5:1. In general as the number of alkyl groups increases in the alkylated aromatic, the non-alkylated aromatic hydrocarbon should be increased accordingly. Thus, at least two mols of benzene are required per each mol of tri-methyl benzene.

The following example is introduced to further illustrate the novelty and utility of the present invention but not with the intention of unduly limiting the same.

*Example*

A mixture of benzene and diethylbenzene in the ratio of 3.5 mols of benzene to 1 mol of diethylbenzene may be contacted with an alumina catalyst in the presence of 1 mol per cent of hydrogen chloride at atmospheric pressure and a temperature of 550° C. to produce 35% of monoethylbenzene on a once-through basis.

I claim as my invention:

1. A process for the transfer of alkyl substituent groups from a polyalkylated aromatic hydrocarbon to a non-alkylated aromatic hydrocarbon, which comprises subjecting a proportioned mixture of said polyalkylated and said non-alkylated aromatic hydrocarbons to contact with an alumina-containing catalyst and a hydrogen halide under alkyl transfer conditions of temperature, pressure and time.

2. A process for the transfer of alkyl substituent groups from a polyalkylated benzene to benzene, which comprises subjecting a proportioned mixture of said polyalkylated benzene and said benzene to contact with an alumina-containing catalyst and a hydrogen halide under alkyl transfer conditions of temperature, pressure and time.

3. A process for the transfer of alkyl substituent groups from a polyalkylated aromatic hydrocarbon to a non-alkylated aromatic hydrocarbon, which comprises subjecting a proportioned mixture of said polyalkylated and said non-alkylated aromatic hydrocarbons to contact with an alumina-containing catalyst and a hydrogen halide at a temperature of from about 350 to about 700° C.

4. A process for the transfer of alkyl substituent groups from a polyalkylated benzene to benzene, which comprises subjecting a proportioned mixture of said polyalkylated benzene and said benzene to contact with alumina and hydrogen chloride at a temperature of about 400 to about 600° C.

5. A process for the manufacture of toluene which comprises subjecting a proportioned mixture of a polymethylbenzene and benzene to contact with alumina and hydrogen chloride at a temperature of about 400 to about 600° C.

6. A process for the manufacture of ethylbenzene which comprises subjecting a proportioned mixture of a polyethylbenzene and benzene to contact with alumina and hydrogen chloride at a temperature of about 400 to about 600° C.

7. A process for the manufacture of isopropylbenzene which comprises subjecting a proportioned mixture of a polyisopropylbenzene and benzene to contact with alumina and hydrogen chloride at a temperature of about 400 to about 600° C.

8. A process for the manufacture of a monoalkylated aromatic hydrocarbon by transfer of an alkyl group from a polyalkylated aromatic hydrocarbon to a non-alkylated aromatic hydrocarbon, which comprises heating said non-alkylated aromatic hydrocarbon to a temperature above that required for said alkyl transfer, separately heating said polyalkylated aromatic hydrocarbon to a lower temperature, commingling the separately heated streams and contacting the same with a catalyst comprising alumina and a hydrogen halide at alkyl transfer conditions of temperture, pressure and time.

WILLIAM J. MATTOX.